Dec. 5, 1933.  E. M. BOUTON  1,937,808

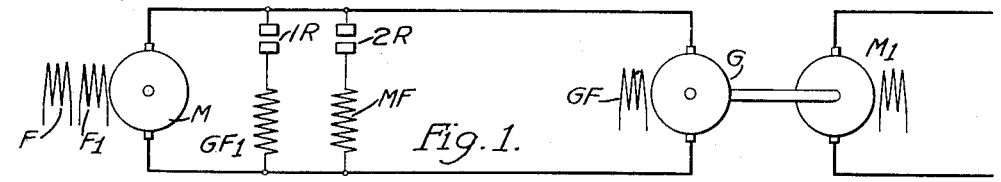
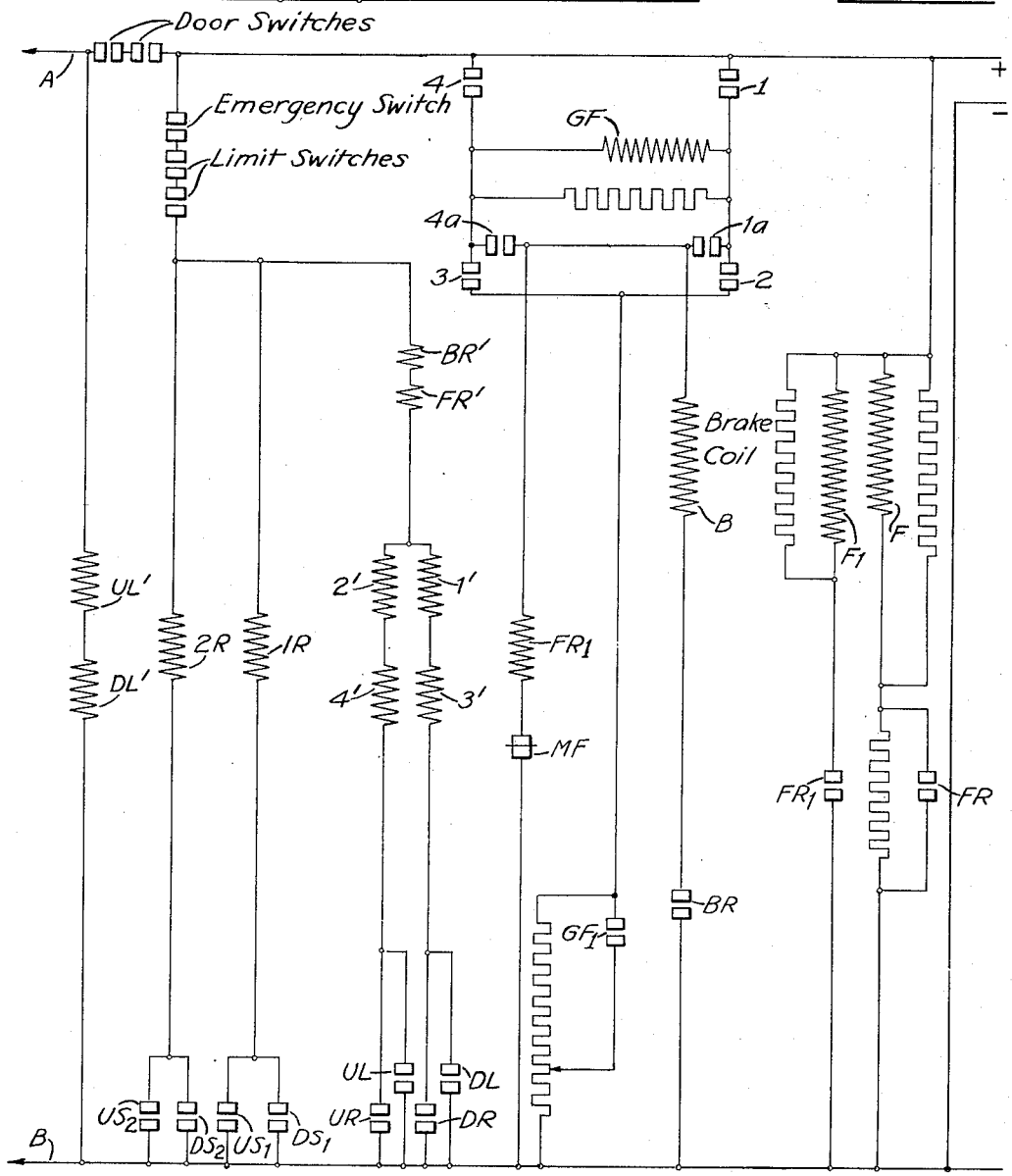

ELEVATOR CONTROL SYSTEM

Filed June 24, 1924  7 Sheets-Sheet 2

Floor Selector Switches  Terminal Plug Board

WITNESSES:  INVENTOR
G. S. Neilson  Edgar M. Bouton
M. Keith  BY
  Wesley G. Clearr
  ATTORNEY Dec. 5, 1933.   E. M. BOUTON   1,937,808
ELEVATOR CONTROL SYSTEM
Filed June 24, 1924   7 Sheets-Sheet 3

WITNESSES:   INVENTOR
G. S. Neilson   Edgar M. Bouton
   BY
   Wesley G. Carr
   ATTORNEY Dec. 5, 1933.   E. M. BOUTON   1,937,808
ELEVATOR CONTROL SYSTEM
Filed June 24, 1924   7 Sheets-Sheet 4
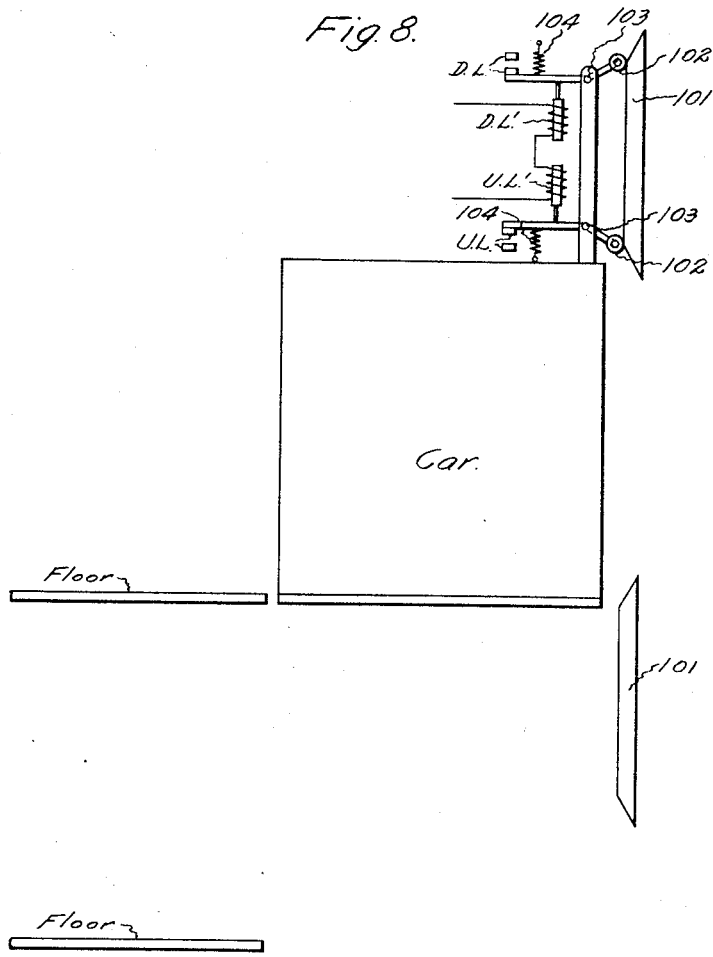
WITNESSES:
INVENTOR
Edgar M. Bouton.
BY
ATTORNEY Dec. 5, 1933.     E. M. BOUTON     1,937,808
ELEVATOR CONTROL SYSTEM
Filed June 24, 1924     7 Sheets-Sheet 5
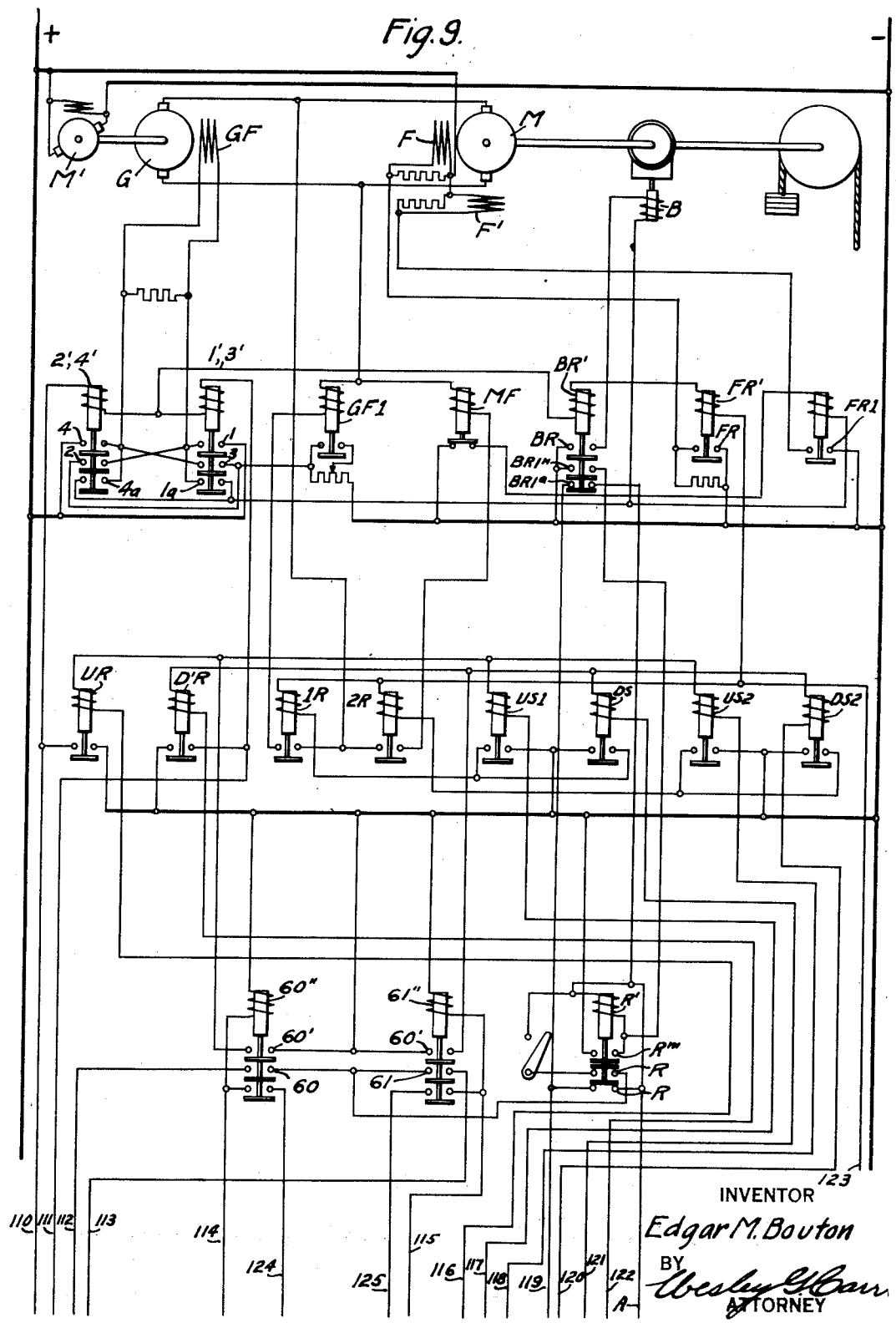

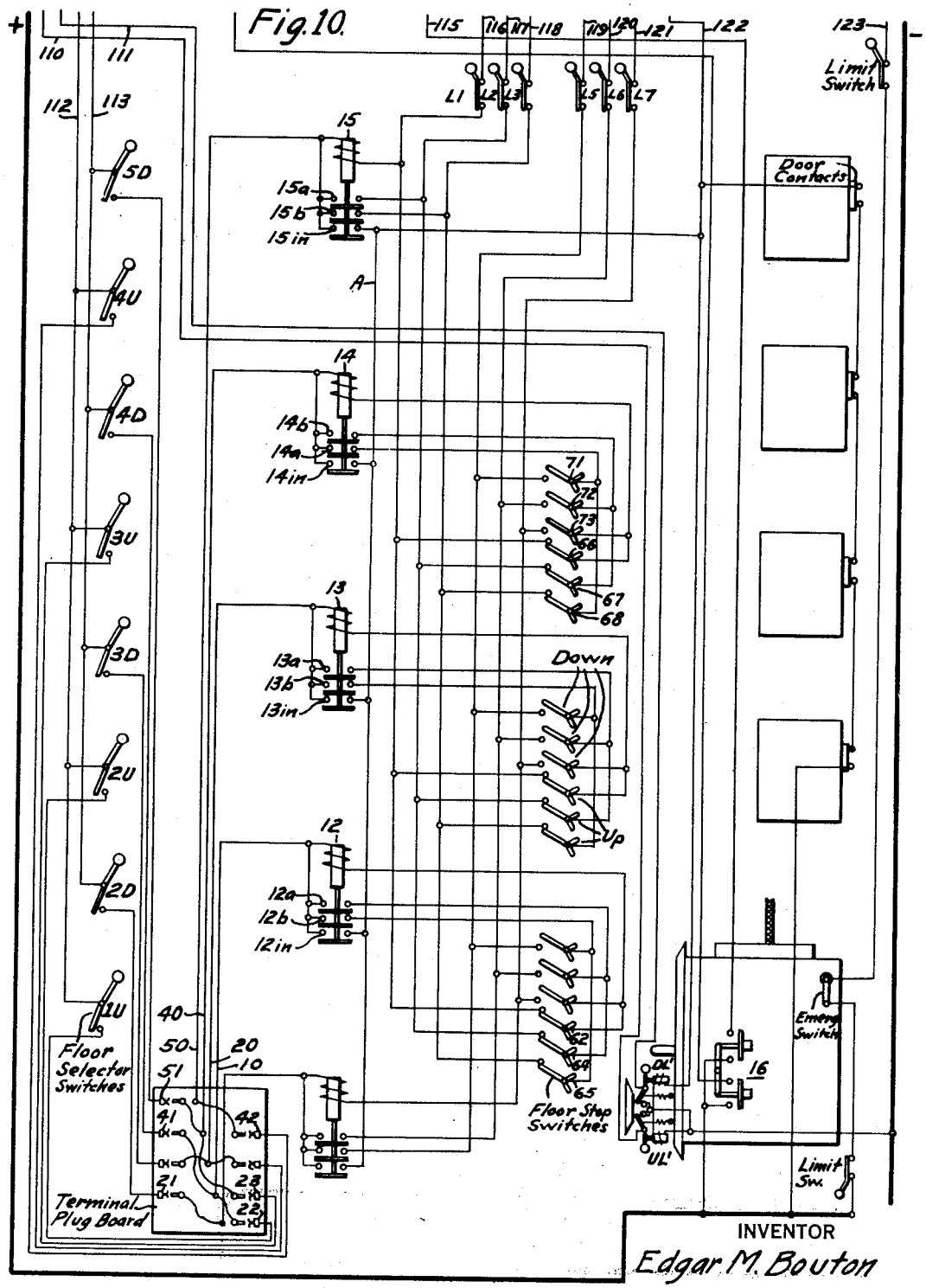

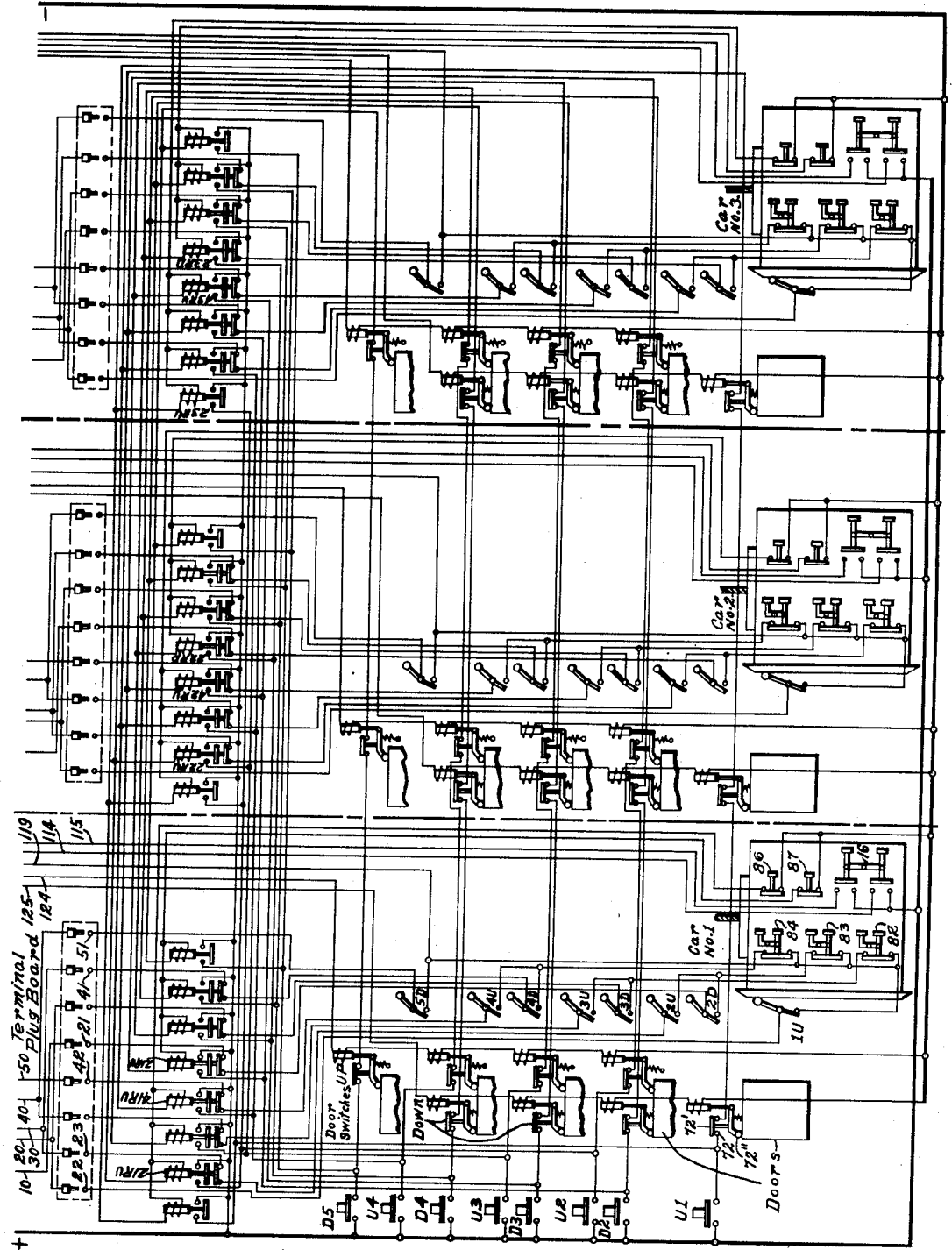

Patented Dec. 5, 1933

1,937,808

UNITED STATES PATENT OFFICE

1,937,808

ELEVATOR CONTROL SYSTEM

Edgar M. Bouton, East Pittsburgh, Pa., assignor to Westinghouse Electric & Manufacturing Company, a corporation of Pennsylvania Application June 24, 1924. Serial No. 722,047

16 Claims. (Cl. 187—29)

My invention relates to systems of control and it has particular relation to systems employed in connection with elevators, hoists and similar machines.

One object of my invention is to provide a system of control whereby an elevator car is maintained in a definite schedule of stops that may be predetermined.

A second object of my invention is to provide a system of control whereby the operation of the elevator is effected by means of push-button switches and whereby a plurality of cars may be simultaneously controlled to maintain an efficient schedule of operation.

Other objects of my invention will be apparent from the following description and the claims appended thereto.

My invention will be described in connection with the accompanying drawings in which, Figure 1 is a diagrammatic view of the main circuits of a control system embodying my invention;

Figs. 2 and 3 are diagrammatic views of the control circuits employed in connection with Fig. 1;

Fig. 4 illustrates a terminal board for modifying the connections illustrated in Fig. 3;

Fig. 8 is a detail view of a leveling device which may be used with my invention.

Figure 5:
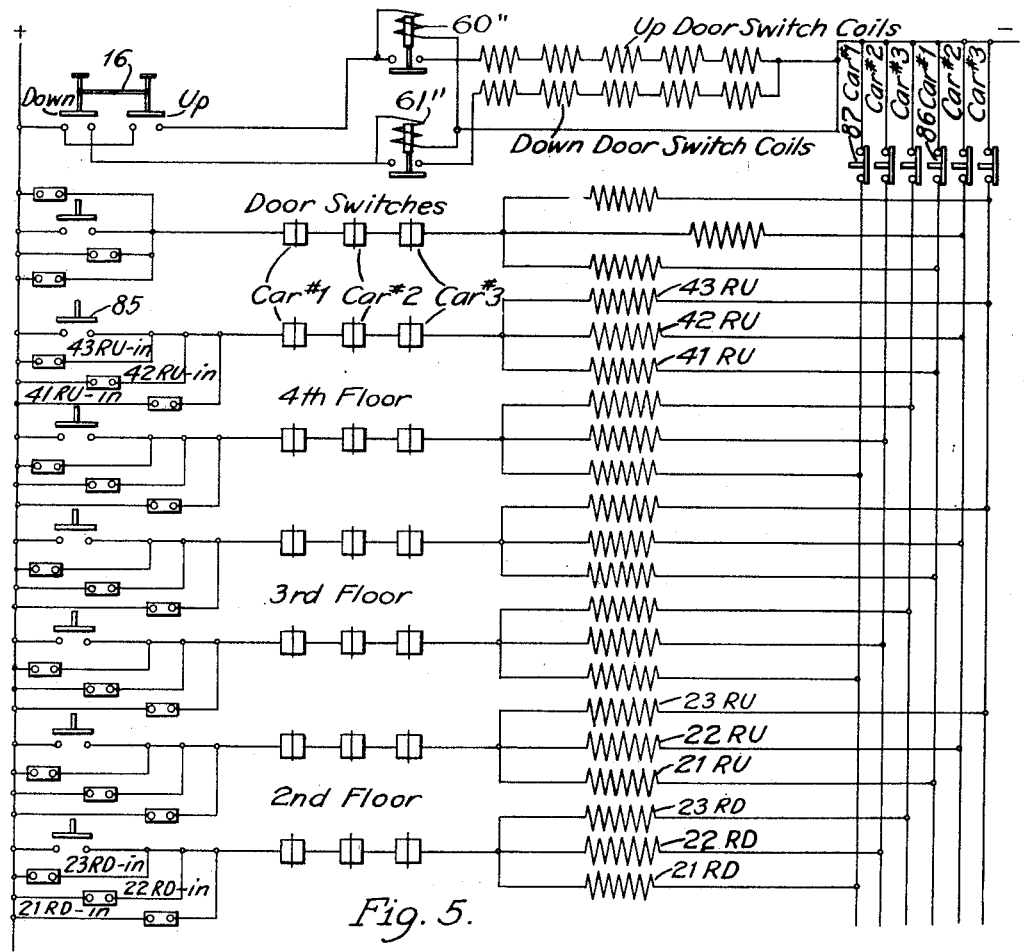
Fig. 5 is a diagrammatic view illustrating another form of my invention.
Figures 6, 7:
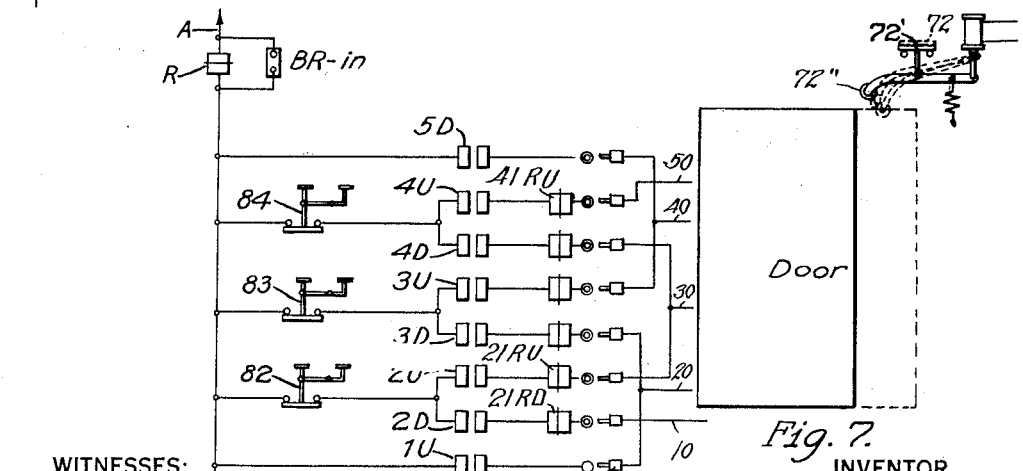
Fig. 6 illustrates certain connections employed for push-button operation in connection with the systems illustrated in Figs. 2 and 3.
Fig. 7 illustrates a door switch employed in connection with my push-button system of control.

Figs. 9 and 10 jointly constitute a diagrammatic view of the system illustrated in Figs. 1 to 4 in the form of a wiring diagram; and Fig. 11 constitutes a diagrammatic view of the modified form of my invention as illustrated in Figs. 5, 6 and 7 also shown in wiring diagram form.

My invention will be described first in connection with Figs. 1, 2, 3 and 4, wherein the elevator car is operated on a definite schedule and makes certain stops only. A dispatcher or other authorized person may predetermine the stops that the car is to make by reason of the terminal board connections illustrated in Fig. 4. The car operator cannot change this schedule and he acts only as a conductor to announce the floors and to open and close the doors in a familiar manner.

With reference to Figs. 1 and 9, an elevator motor, having an armature M and separately excited field-magnet windings F and $F_1$, is adapted to be energized from a variable voltage generator having an armature G connected in loop circuit with the motor armature. The generator is provided with a separately excited field winding GF for controlling the generator voltage and the direction of operation of the elevator motor in a familiar manner. The generator armature is normally continuously driven by any suitable prime mover, such as the illustrated motor M1.

Referring to Figs. 2 and 9, direction switches 1, 2, 3 and 4 control the generator field winding GF. Relay BR controls the brake magnet coil B which is of the usual shunt type, and relay FR controls the motor "standing" field winding F. The direction switch coils 1', 2', 3' and 4' are energized through a pair of up and down relays UR and DR, and relays IR and $GF_1$ and provided for effecting speed control, $GF_1$ being controlled in accordance with the counter E. M. F. of the motor, to control the degree of the generator field excitation.

Up and down relays $US_1$ and $DS_1$ connect the operating coil of relay IR to the separate source of energy. Up and down speed relays $US_2$ and $DS_2$ control the operating coil of relay 2R. Relay 2R is adapted to connect the operating coil of relay MF to the elevator-motor armature. Relay MF controls relay $FR_1$ which, in turn, controls the motor extra field winding $F_1$. A pair of levelling switches UL and DL are controlled in a well-known manner whereby they are normally "retired" or retracted, by a suitable magnet comprising coils UL' and DL'. The levelling switches are rendered effective upon opening any door. The switches are actuated by means of suitable cams 101 (Fig. 8) that are disposed at points in the elevator hatch-way adjacent to the various floors, for the well-known purpose of maintaining the elevator car at a proper level.

Figures 3, 4:
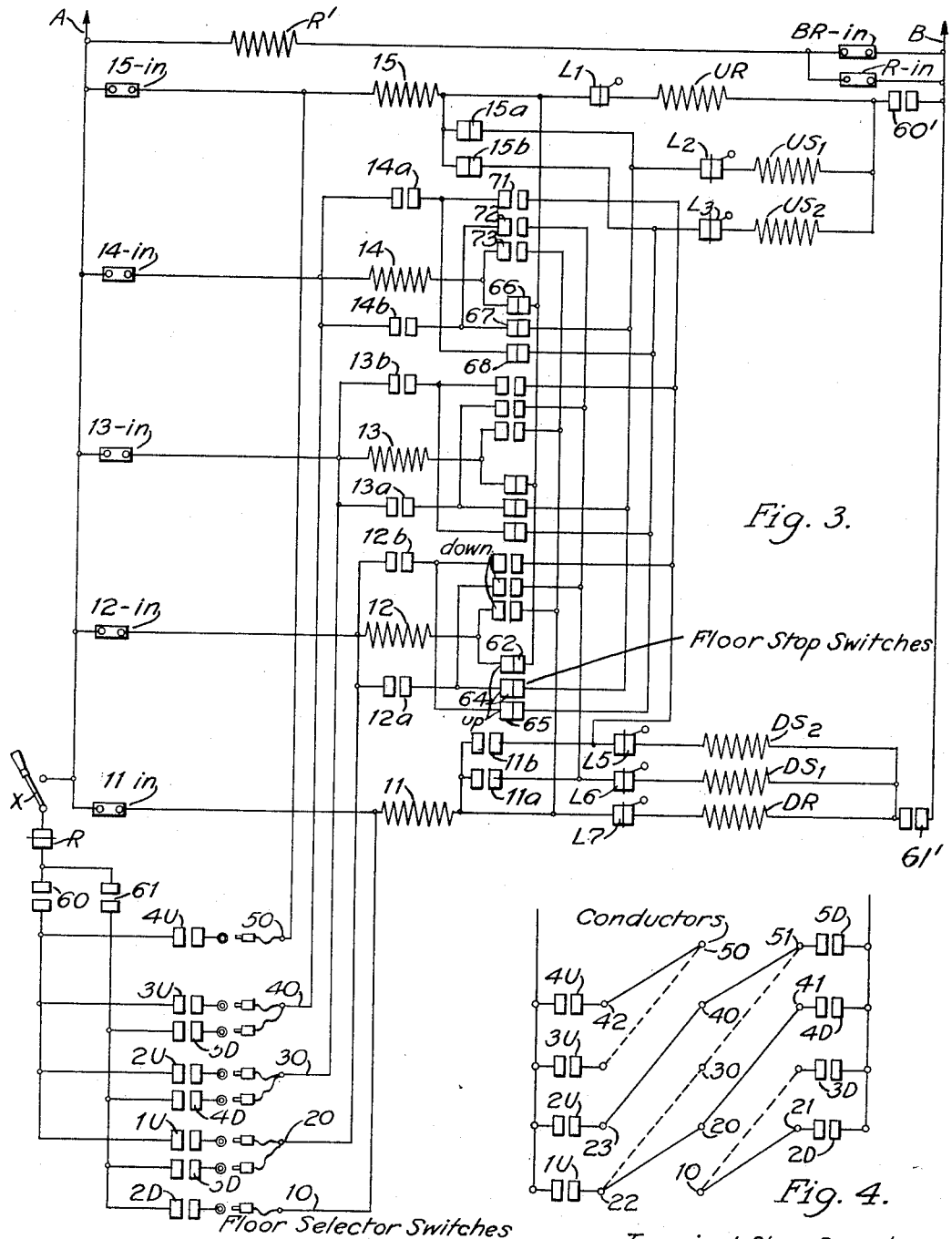

A "floor-stop-device", such as commonly employed in connection with push-button elevators, is provided, having three switches, such as 62, 64 and 65 at each intermediate floor for each direction of travel and controlling a plurality of floor relays 11 to 15 inclusive (Figs. 3 and 10).

The floor relays, in accordance with my system, are controlled by means of an auxiliary device which I shall term a "floor selector". This device may be mechanically connected to the elevator as is the ordinary geared-limitswitch and similarly comprises progressively actuated switches. I prefer to employ such a device having cam-operated switches 1U, 2U, 3U, 4U, 2D, 3D, 4D and 5D (Fig. 4). The selector switches corresponding to any floor are closed when the elevator car is within the stopping zone that is adjacent to that floor. For example, switches 2U (Up) and 2D (Down) are closed when the car is adjacent to the second floor, but open again when leaving the floor. A push-button station 16 of the walking-beam type (see Figs. 5 and 10) is located in the elevator car for determining the up and the down direction of the motions of the elevator and this switch remains closed during the entire up and down motions of the elevator.

The operation of this form of my control system will be best understood with reference to the accompanying drawings, in which the apparatus is illustrated in its inoperative condition. Assuming that the car is at the first floor, selected plugs are first inserted in the terminal board illustrated in Figs. 4 and 10. If the plugs are inserted at 22, 23 and 42 to complete a circuit indicated by the full lines, the car may be operated from the first to the 5th floors, for example, stopping at the second, fourth and fifth floors only. When the car is at the first floor, the floor selector switch 1U is closed as previously indicated. Push button 16 is operated to close its "up" contact members and the car is started upon closure of the door, whereupon a circuit is established from line conductor A through switches X, R, up circuit relay contact members 60, selector switch 1U (now closed), conductor 20, floor relay coil 12, floor stop switch 62, up limit switch L1, relay coil UR, and up circuit relay 60' to line conductor B. Floor relay 12 upon closing maintains a self-holding circuit through interlock 12-in which interlock shunts the floor selector switch 1U. A circuit is established also from line conductor A through interlock 12—in, contact member 12a of floor relay 12, floor switch 64, limit switch L2, relay coil US1 and switch 60' to conductor B. Similarly, relay US2 is energized through switches 12b and 65. The operating coil for relay contact members 60 and 60' are designated by the characters 60'' (see Fig. 5).

Referring to Figs. 2, 9 and 10 it will be noted that closure of relay UR, as above indicated, energizes the operating coils 2' and 4' of the direction switches 2 and 4, as well as the operating coils BR' and FR' of the brake and the field relays BR and FR through the emergency and limit switches. A circuit is established through interlock BR—in for relay coil R' as indicated in Fig. 3, whereby relay R is picked up and maintains a self-holding circuit for itself. This relay interrupts a circuit through the floor selector switches and therefore, when the elevator proceeds to the second floor it is automatically stopped by means of the floor stop switches 64, 65 and 62. These switches are progressively opened to drop out relays US2, US1, UR and floor-relay 12. The function of the speed relays US1 and US2 will be described later.

When the door is opened, relay coil R' is de-energized and switch R again closes permitting floor relay 14 to be energized when the door again closes. Therefore, when the door at the second floor is again closed, the elevator car may in a similar manner proceed to the next stopping point, which in this case is the fourth floor. The operating circuit now extends from conductor A through switches X, R, up-circuit relay 60, floor selector switch 2U, conductor 40, relay coil 14, floor-stop-switch 66, hatch limit switch L1, relay UR and switch 60' to conductor B. Relay 14 is self-holding through interlock 14—in and it also effects the energization of relay coils US1 and US2 through its contact members 14a and 14b. The car in its upward motion passes the third floor without stopping, since conductor 30 is open-circuited at the terminal board.

The car proceeds to the fourth floor, whereupon the corresponding floor-stop switches 68, 67 and 66, are successively opened to drop out relays US2, US1, UR and 14, thus bringing the car to rest. When the fourth floor door is opened, relay coil R' is again de-energized and switch R again closes in preparation for further movement of the car, which is effected by reclosing the door. Thereupon, a circuit is established for the fifth floor relay coil 15 extending through floor selector switch 4U, conductor 50, relay coil 15, limit switch L1 and relay UR. Relay 15 is likewise provided with a self-holding circuit through interlock 15—in and in turn it "picks up" relay US1 and US2 to accelerate the elevator toward the fifth floor.

As the car approaches the fifth floor, limit switches L3, L2 and L1 are operated progressively to slow down and stop the car. The opening of relay UR brings the car to rest.

In the foregoing description of operation, I have assumed that the elevator in each case has stopped substantially level with the desired floor. If in any case, the proper level is not attained, it is of course automatically effected in a familiar manner by means of the levelling switches UL and DL which are connected in circuits respectively paralleling the up and the down relays UR and DR for controlling the operation of the direction switches. The levelling switches UL and DL are mounted on bell-crank levers, the other ends of which are provided with cam rollers 102 for engaging cams 101 in the hatchway, for opening the switches. The bell-crank levers are mounted to rotate about pivot points 103 and the switches are normally held in their closed position by the springs 104. The magnet coils UL' and DL' are connected in series circuit relation and when energized, operate the bell-crank levers to open the switches and retract the cam rollers 102 to a position where they will pass the hatchway cams 101 without being operated thereby. When the coils DL and UL are de-energized, upon opening of the car door at a given landing, the springs 104 tend to close the switches should the car be in the position indicated in Fig. 8, (that is, level with the floor landing), the cam rollers 102 will engage the front face of the cam 101 near the sloping portions thereof. Should the car stop either above or below the floor landing, one of the cam rollers 102 will be above or below the cam 101 and the corresponding levelling switch DL or UL will be closed, causing the car to operate to a position level with the floor landing, in which position both levelling switches are held open by the cam.

Having made clear the essential details of the automatic starting and stopping of the elevator, I will now refer to automatic speed control features that are not essential for slow-speed elevators but become of importance in high-speed operation. Referring to Figs. 2, 3 and 9, the closure of relay UR initiates the elevator operation at slow speed. When relay US₁ closes, the actuating coil of relay 1R is energized to cause the relay to connect the coil GF₁ of generator field relay GF across the motor armature. The relay GF, which is controlled in accordance with the counter E. M. F. of the motor, closes to shunt a portion of the illustrated generator field resistor, thereby increasing the generator voltage and the motor speed. When relay US₂ operates, it energizes relay 2R, which in turn connects relay MF across the motor armature. This relay may be adapted to close at a higher voltage than relay GF and, when closed, it de-energizes relay FR₁ which disconnects the motor field winding F₁, to thereby further increase the motor speed. Deceleration of the motor is, as previously indicated, effected by the operation of the field relays in a reverse order.

With the terminal-board arrangement illustrated in Figs. 4, 10 and 11 the car, in its downward movement, will stop at the fourth, second and first floors only. The control operations during the down movement correspond to those described for the upward travel with the exception that the push-button station must be operated for "down" motion to maintain relay 61 closed, and the floor selector switches 5D, 4D and 2D become effective. That is, selector switch 5D establishes a circuit to conductor 40 for controlling relay 14 and relays DR, DS₁ and DS₂ through the down floor stop switches 71, 72 and 73. The car starts downward, upon the closure of the fifth-floor door, the door switch completing a circuit for floor relay 14 and relay DR, which control brake and field relays BR and FR and direction switches 1 and 3. The car starts downward and stops at the fourth floor upon the opening of the down floor-stop switches 71, 72 and 73. After starting from the fourth floor, the car will continue to the second floor without stopping at the third floor, since the third floor circuit is open at the terminal board. In like manner the car is stopped at the second floor. At the first floor it is stopped by means of the limit switches L5, L6 and L7 respectively, in a similar manner to that described for the upward travel.

The schedule of operation may be altered by changing the connections at the terminal board as, for example, when connected as per the dotted lines, the car when leaving the first floor, will stop at the third and fifth floor going up and the third and first floors coming down. Different stops may be made coming down than going up, such as following the dotted line connections "up" for the first, third and fifth floors and coming down through the use of the solid line connections, stopping at the fourth, second and first floors.

My system may be further employed in connection with a push-button control system, the control circuits of which are indicated principally in Figs. 5 and 6, in conjunction with Figs. 1 and 2. The push-button control system is also illustrated in Fig. 11 when considered in conjunction with Figs. 9 and 10. It will be observed that conductors 110 to 125, inclusive, and conductor A, terminating at the lowermost portion of Fig. 9, are continued in Fig. 10 as conductors having respectively corresponding reference numerals. Hence, the application of Fig. 11 to Figs. 9 and 10 consists in connecting conductors shown in Fig. 11 to conductors having corresponding reference characters in Figs. 9 and 10. In consideration of Fig. 11, it is to be understood that the terminal plug board illustrated in Fig. 10 has substituted therefor the terminal plug board illustrated in Fig. 11. Reference characters used in terminating parts in Figs. 1 to 7 are used to terminate corresponding parts in Figs. 9, 10 and 11 with the exception that the additional reference connection U1, D2, U2, etc., have been used to indicate the push buttons associated with the first, second and third, etc., floors, respectively. For this operation, switch X in Fig. 3, remains open. An up and down push button switch 16 is provided in each car. There is also required an auxiliary floor relay for each floor. The system illustrated is arranged for the operation of three cars serving five floors.

The auxiliary relays are indicated in the following manner: 21RD is the auxiliary down relay for floor 2, car 1. 22RD is the auxiliary down relay for floor 2, car 2. Similarly 21RU is the auxiliary up relay for floor 2, car 1; 22RU is the auxiliary up relay for floor 2, car 2, and the other relays are correspondingly designated. These relays are provided with normally closed contact members in the floor selector circuits (see Figs. 6 and 11) and are also provided with self-holding interlocks. In the car is provided a "stop and start" button, such as 82, 83 or 84 for each intermediate floor connected between conductor A and the floor selector contact members 1U, 2U, 2D, etc. An auxiliary set of door switches is connected in the hall push-button circuits.

Fig. 7 illustrates a suitable door switch 72, two of which are required for each floor, one for each direction of operation. The coils of these door switches are energized by means of the up and down push-buttons 16 located in each car. When any coil is energized, the switch roller is moved down to engaging position with the corresponding door. When the door is opened the switch contact members are broken by the lifting of contact bar 72' by the roller 72''. This arrangement is such that the stopping of cars moving downward, does not interfere with a call to up-going cars.

Assuming a car at the first floor with selector switch 1U closed, (Fig. 6) upon the closure of the door a circuit is established through switch 1U to conductor 20, floor relay coil 12, (Fig. 3) and floor stop contact members 62, 64 and 65 to energize relays UR, US₁ and US₂ as for the previously described operation. The car will start upward and continue to the top floor, since contact member R is provided with a shunt circuit closed by contact members BR—in (see Fig. 6) unless the car operator pushes a stop-button to open its normally closed contact members or unless there is a call by a waiting passenger operating one of the hall-buttons. If the car operator pushes the third-floor stop button 83, a circuit to conductor 40 is interrupted and the car must stop at the third floor. It should be noted that when the car started from the first floor, the second floor relay 12 was energized and when entering the second floor zone, the third floor relay 13 becomes energized and, similarly, in its upward movement, the floor relays are successively energized unless the stop-button corresponding to the desired floor is operated. Therefore, when the car is in that particular stopping zone it is brought to rest by the operation of the corresponding stop button.

In order to again proceed, it is necessary to move the operated stop-button to again close its contact members, after which the floor-selector switches automatically continue the movement of the car. Should a waiting passenger, for example, operate the fourth floor button U4, relays 41RU, 42RU and 43RU are immediately energized and held in through their holding interlocks. The operation of these relays effects the opening of conductor 50, as illustrated in Fig. 6, and this corresponds to an operation of the stop button, since these switches are in series relation. Therefore, car No. 1, when reaching the fourth floor will stop.

On each car is provided a pair of by-pass buttons, 86 and 87 one for "up" and one for "down", so that should the operator actuate the up by-pass button 86 in car No. 1, the car will not stop at the fourth floor but the next succeeding car No. 2 or car No. 3 as the case may be, will stop at that floor. When any car stops at the floor, the opening of the door interrupts the holding circuits of the auxiliary floor relays such as 41RU, 42RU and 43RU, and thereby restores the circuits of all the cars. In other words, the first car to stop automatically cancels the call to the remaining cars. The opening of the door does not, however, cancel calls to the down-coming cars since the down door switches are in a separate relay circuit.

With the arrangement just described, it is usually advisable to dispense with the terminal board indicated in Fig. 4. However, the automatic levelling feature previously alluded to may be incorporated in this system, as illustrated, since the levelling system is independent of the regular operating means, when the car is within the stopping zone and operating at low speed.

The first embodiment of my system, as described, may be advantageously employed in connection with a plurality of elevators under conditions where it is desirable to maintain predetermined schedules. The maintenance of definite schedules is well understood and appreciated by those familiar with the art.

The further adaptation of my system for automatic push-button control is particularly desirable for high-speed service, wherein an operator is preferably maintained in each car so that in order to maintain a proper schedule or permit a full car to continue uninterrupted, the system of the by-pass buttons may be employed. Another and very important feature of the latter system insures the automatic stopping of a car at successive floors in its travel in response to successive calls, whereas in systems heretofore employed, the car passes by the near floors and stops at the most remote point. Furthermore, in accordance with my system, the stopping of the car does not cancel the calls previously set up for other floors.

Various modifications may be made by those skilled in the art without departing from the spirit and scope of my invention, which has been described in preferred form and illustrated, diagrammatically, in a manner that is easily understood. I desire, therefore, to be limited only in accordance with the appended claims.

I claim as my invention:—

1. In an elevator system, the combination with a car and controlling means therefor, of a plurality of floor-relays for dispatching the car to all floors, switches actuated by the car for controlling said relays, and a plurality of manually operable switches for excluding certain floors.

2. In an elevator system, the combination with a car and controlling means therefor, a plurality of floor-relays for dispatching the car to all floors, a plurality of manually operable switches for excluding certain floors, and additional means for effecting and maintaining a predetermined car-level at each floor.

3. In an elevator system, the combination with a car and controlling means therefor, of a plurality of floor-relays for dispatching the car to all floors, switches actuated by the car for controlling said relays, a plurality of manually operable switches for excluding certain floors, and additional means for effecting and maintaining a predetermined car-level at each floor.

4. In an elevator system, the combination with a plurality of cars, of means for initiating the up and the down motion of each car, means for stopping at any floor in response to a call, means for cancelling any call and transferring said call to other cars, and means comprising a pair of electro-responsive door switches at each floor for preventing interference between up and down calls.

5. In an elevator-control system, a car controller comprising a main control lever, contacts for up motion and contacts for down motion, a motor and drive gear for the actuation of said elevator, cooperating control means including contactors connected between said car controller and said motor for the control thereof, and an auxiliary control means incorporated in said controller for the independent actuation of said control means for stopping and starting the car during the travel in a given direction while said main control lever occupies an operating position.

6. In an elevator-control device, a controller having contact members for the normal control thereof including selection between upward and downward directions, and auxiliary contact members for the actuation of auxiliary control devices to stop and start said elevator without moving the controller from operative position.

7. In an elevator-control device, a controller element comprising main control members for determining the direction of travel, and auxiliary control members effective to stop and start in a given direction only without movement of the main control element from its operative position, and means for rendering said auxiliary members effective with respect to a floor level.

8. An elevator installation comprising a motor, a control circuit therefor including a starting switch and a normally closed automatically operable stopping switch for opening the circuit through the motor at a predetermined point in its operation, a by-pass around said stopping switch, a magnetic coil common to the main control circuit and the circuit through said by-pass, a switch in said by-pass which is normally closed so that the stopping switch is ineffective to stop the motor, and a magnet under manual control to open the by-pass switch to render said stopping switch effective.

9. An elevator installation comprising a motor, a control circuit therefor including a starting switch and a normally closed automatically operable stopping switch for opening the circuit through the motor at a preselected point in its operation, a by-pass around said stopping switch, a switch in said by-pass, a magnetic coil for controlling the by-pass switch which is held open when said coil is energized, thereby rendering said automatically operable stopping switch effective to stop the motor after the switch in the by-pass has been opened, and manually controlled means for interrupting the circuit through said coil, thereby permitting the by-pass switch to close and rendering the stopping switch ineffective.

10. In an elevator controller, a master control lever, and cooperating contacts for operating the car, an auxiliary switch, and auxiliary contacts for the actuation of auxiliary motor-control circuits while the control lever occupies an operating position.

11. In an elevator controller, a master control lever and an auxiliary control push-button including auxiliary contacts for the actuation of auxiliary control circuits, and means comprising circuits and contactors for slowing down and stopping said elevator car upon the actuation of said push-button when said control lever is in operating position and for resuming travel in the same direction upon the release of said push-button.

12. In an elevator installation comprising an electric motor, electromagnetic means for controlling the current to the motor, a starting switch for energizing said means, means for maintaining current through said means after the starting switch has been operated, an automatically operated floor switch for interrupting the current through said means at each floor, a by-pass for a floor switch, a normally closed switch in the by-pass, and manually controlled means for opening said by-pass switch.

13. In an elevator installation comprising an electric motor, electromagnetic means for controlling the current to the motor, a starting switch for energizing said means, means for maintaining current through said means after the starting switch has been operated, an automatically operated floor switch for interrupting the current from said means at each floor, a by-pass for a floor switch, a normally closed switch in the by-pass, electromagnetic means for opening the by-pass switch, and manually controlled means for energizing the last said electromagnetic means.

14. In an elevator-control system, an elevator, motive means for said elevator, a control device on said elevator actuable from a normal to a single-circuit-closing position, starting-control means for said motive means operably responsive to an actuation of said control device, speed-control means for said motive means controlled by said control device, and means for delaying the operation of said speed-control means, whereby said speed-control means is responsive only to a sustained actuation of said control device.

15. In an elevator-control system, an elevator motor having a separately excited field winding, a generator having a separately excited field winding for supply power to said motor, means for starting and accelerating said motor to a predetermined high speed including means for increasing the excitation of the generator field winding in steps and for decreasing the excitation of said motor field winding, and speed-responsive means for rendering the decreasing of the motor field excitation and the highest of the steps of generator excitation ineffective while the speed of said motor is below a predetermined intermediate value.

16. In an elevator control system, an elevator motor, a generator having a field winding for supplying power to said motor, means for accelerating said motor through a predetermined speed range including means for increasing the excitation of the generator field winding in a plurality of steps and speed-responsive means for rendering the highest of the steps of generator excitation ineffective until the motor attains a predetermined speed intermediate the limits of said range.

EDGAR M. BOUTON.